O. T. GRONNER.
Circular Sawing-Machines.

No. 151,386. Patented May 26, 1874.

WITNESSES:
G. Mathys
Solon C. Kemon

INVENTOR:
Ole T. Gronner
BY
ATTORNEYS.

UNITED STATES PATENT OFFICE.

OLE T. GRONNER, OF BALTIMORE, MARYLAND.

IMPROVEMENT IN CIRCULAR-SAWING MACHINES.

Specification forming part of Letters Patent No. 151,386, dated May 26, 1874; application filed April 22, 1874.

*To all whom it may concern:*

Be it known that I, OLE T. GRONNER, of Baltimore city, in the State of Maryland, have invented a new and Improved Circular-Sawing Machine; and I do hereby declare that the following is a full, clear, and exact description of the same, reference being had to the accompanying drawing forming a part of this specification, in which—

Figure 1:
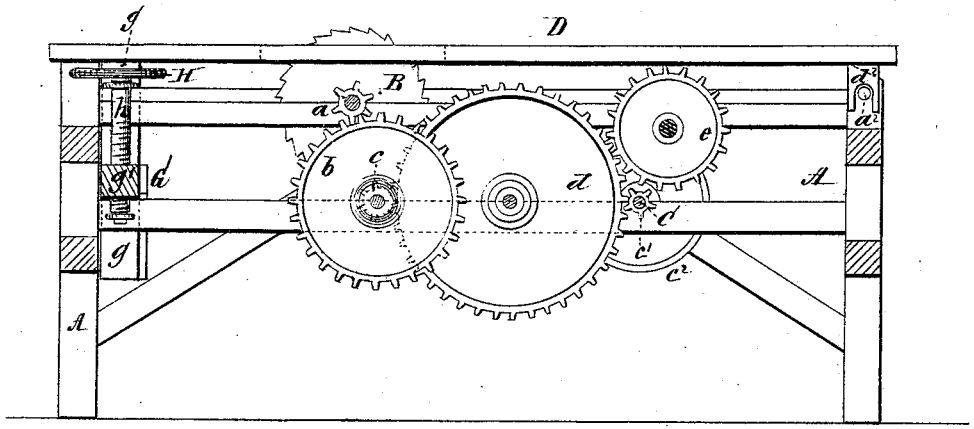
Figure 2:
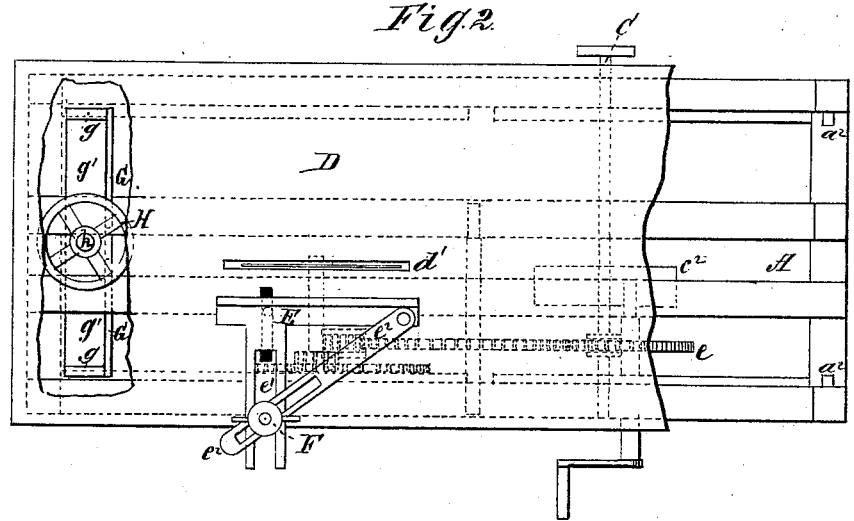

Figure 1 is a sectional elevation, and Fig. 2 a plan view, partly broken away.

The invention relates to circular saws, preferably driven by hand-power, and that are provided with suitable operating mechanism. The novel means which I propose to employ in connection with these machines will first be fully described, and then pointed out in the claims.

A represents the frame, in which are placed the saw and its actuating mechanism; B is the rotary saw, and $a\ b\ c\ d\ e$ the train of wheels by which its shaft is rotated.

Ordinarily, the balance-wheel is placed on the hand-crank shaft, but I use a shaft, C, that has a pinion-wheel, $c^1$, gearing with wheel $d$, and operated thereby, and also provided with a balance-wheel, $c^2$, which abstracts a part of the power when the same is being imparted at a maximum rate, re-enforces the same when supplied at a minimum rate, and thus affords a comparatively uniform velocity or rate of speed.

D is the table that supports the lumber, and has a slot, $d^1$, through which works a saw, while E is the gage by which the lumber is held in proper position with relation to the saw. This gage is provided with two slotted arms, $e^1\ e^2$, the former being perpendicular to gage, and placed at the front end, while the latter is diagonal thereto, attached at the rear end, and the two connected by the same clamp-screw F.

By this mode of bracing the gage, I enable it to bear the strain uniformly along its whole face, while, by a single center-brace, the gage has a tendency to swing on the pivot-screw of the brace, and thus turn when the timber is first being brought forward to the saw.

If one perpendicular brace is employed at each end, it is necessary to have an additional clamp-screw, the two screws then not only doubling the time of making an adjustment, but requiring great care to make the two adjustments correspond.

The table D has two end-slotted angle-plates or hangers, $d^2$, under the front end, and these rest upon studs or pivots $a^2\ a^2$ on the inside of the front posts of frame A. The table is thus supported in front on pivots, while in the rear it rests upon the posts $g\ g$ of a vertical and adjustable frame, G. H is a hand-wheel, placed fixedly on the top of a pendent screw, $h$, that works in a nut formed on the cross-bar $g'$. This enables the man who feeds the lumber to easily lower the table as the saw makes progress in cutting the timber.

I am aware that sawing-machine tables have been hinged both at one end and at the sides, and, therefore, I only claim my particular means of pivoting and operating the table by means of a sliding frame.

Having thus described my invention, what I claim as new is—

1. A sawing-machine gage, E, having two slotted brace-arms, $e^1\ e^2$, held by the same clamp-screw F, as and for the purpose set forth.

2. The combination, with a sawing-machine table D, having in front the end-slotted hangers $d^2\ d^2$ pivoted on frame-studs $a^2\ a^2$, of the vertically-adjustable rear frame G and hand-wheel screw H $h$, as and for the purpose described.

OLE T. GRONNER.

Witnesses:
 A. BALLAUF,
 H. C. SMYSER.